United States Patent [19]

Grandi

[11] Patent Number: 5,018,438
[45] Date of Patent: May 28, 1991

[54] COOKING AND COOLING TRANSFER APPARATUS AT WILL FOR AUTOMATIC INTRODUCTION AND EVACUATION OF CONTAINERS WHICH CONTAIN FOODS OR PRODUCTS HAVING A VARIABLE DURATION OF COOKING AND COOLING

[76] Inventor: René Grandi, "Loudon Ruy", 38300 Bourgoin Jalieu, France

[21] Appl. No.: 278,921
[22] PCT Filed: Feb. 29, 1988
[86] PCT No.: PCT/FR88/00112
 § 371 Date: Jan. 3, 1989
 § 102(e) Date: Jan. 3, 1989
[87] PCT Pub. No.: WO88/06408
 PCT Pub. Date: Sep. 7, 1988

[30] Foreign Application Priority Data

Mar. 2, 1987 [FR] France .................. 87 02905

[51] Int. Cl.$^5$ ............................................ A47J 37/12
[52] U.S. Cl. .................................... 99/335; 62/159;
 62/380; 99/327; 99/330; 99/357; 99/404;
 99/407; 99/443 C; 99/477; 99/517; 134/134;
 134/126; 198/346.1
[58] Field of Search ...................... 99/334–336,
 99/325, 330, 326, 327, 337, 341, 352, 355, 356,
 357, 359–362, 367, 517, 403, 404, 407, 483, 443
 R, 443 C, 468, 477; 198/346.1; 134/134, 83,
 126; 62/382, 380, 378, 157, 159

[56] References Cited

U.S. PATENT DOCUMENTS

| 2,616,359 | 11/1952 | Pierson | 99/404 |
| 2,789,569 | 4/1957 | Davis | 134/83 |
| 2,807,203 | 9/1957 | Buechele et al. | 99/404 |
| 2,903,722 | 9/1959 | McConchie et al. | 198/346.1 |
| 2,928,401 | 3/1960 | Finston | 134/76 |
| 3,296,954 | 1/1967 | Haub et al. | 99/407 |
| 3,505,072 | 4/1970 | Rullman | 99/336 |
| 4,169,408 | 10/1979 | Mencacci | 99/355 |
| 4,685,386 | 8/1987 | Bezon | 99/443 C |
| 4,773,321 | 9/1988 | Wijts | 99/483 |
| 4,805,759 | 2/1989 | Rochet et al. | 198/346.1 |

FOREIGN PATENT DOCUMENTS

| 0015848 | 9/1980 | European Pat. Off. |  |
| 2447884 | 8/1980 | France. |  |
| 2492224 | 4/1984 | France. |  |
| 2579072 | 9/1986 | France. |  |
| 48-35135 | 10/1973 | Japan | 134/76 |
| 101408 | 4/1962 | Netherlands | 134/76 |
| 1455639 | 11/1976 | United Kingdom. |  |
| 2167031 | 5/1986 | United Kingdom. |  |

Primary Examiner—Timothy F. Simone
Attorney, Agent, or Firm—Sandler, Greenblum & Bernstein

[57] ABSTRACT

An apparatus for preparing foods for predeterminable period of time. One embodiment of the apparatus is for cooking; another is for refrigeration. The apparatus includes either a cooking container or a refrigeration container, a conveyor for carrying food products to and from this container, and a robot assembly for removing food products from the conveyor, inserting them into the container, extracting them from the container after the predetermined cooking or refrigeration period, and returning them to the conveyor. The robot assembly is programmable to extract and return these food products after cooking or refrigeration for a predeterminable period of time.

27 Claims, 2 Drawing Sheets

COOKING AND COOLING TRANSFER APPARATUS AT WILL FOR AUTOMATIC INTRODUCTION AND EVACUATION OF CONTAINERS WHICH CONTAIN FOODS OR PRODUCTS HAVING A VARIABLE DURATION OF COOKING AND COOLING

Cooking and cooling transfer apparatus at will for automatic introduction and evacuation of containers which contain foods or products having a variable duration of cooking and cooling.

There are known processes of steam cooking tunnels or submerged water which are continuous, and likewise apparatus or containers containing the products to be cooked, are displaced by chains or by rollers by gravity, accomplishing a cooking cycle. These cookings follow one behind the other, and each has its own time determined by the product to be cooked, one can therefore not mix the products, each product having its predetermined cooking duration different from one another.

The example of braised meat whose cooking is three hours, cannot be introduced with the "chicken" whose cooking is a half-hour. It is for this reason that these apparatus are required to cook by "cooking family".

The apparatus which will be described avoids all of these inconveniences.

It is constituted by a closed enclosure, containing a container, which can be filled to two levels of water, depending upon the desired cooking: low level for gentle steam cooking and high level submerged water cooking. This container is flow heated, by the desired means, electric gas manifold quills, or likewise by a double full envelope of oil heated by electric quills submerged in this thermal oil.

An introduction and evacuation conveyor brings baskets or containers provided with a handle, and carriers of the products to be cooked, in front of an access gate of the apparatus, this gate slides, and at this moment, a carrier arm, provided with a hook comes to sieze the basket to introduce it into the cooking container. Each basket being introduced one after the other can contain products having a different cooking duration.

This cooking having been programmed on a console, for each product of the basket, once this has ended, the carrier arm provided with the hook siezes the handle of the basket in the cooking container and evacuates through the gate and deposits it on the evacuation conveyor. Within the enclosure, a cover is activated by a motor axis, so as to lift it, to allow the basket to descend or to come out of the container. In the upper portion of the container a hood makes it possible to evacuate the vapors.

This apparatus thus makes it possible to introduce baskets, with products in a random cooking order, these cooking products with gentle steam or flowing can be different and placed side-by-side, without the odors becoming mixed, and by respectively keeping their vitamin and mineral salts.

The robot or carrier arm, having introduced the baskets in disorder, will likewise evacuate them in the same disorder, according to the times which will have been established by a programmable timer which will have put into the memory the cooking times. Thus, but way of example: the first introduction which has just been positioned can contain braised meat with a cooking time of three hours.

The second introduction can be frozen green beans with a duration of forty minutes of cooking.

The third can be chicken with a duration of thirty minutes cooking.

The fourth can be cauliflower with a duration of thirty-five minutes of cooking.

The fifth can be a fish with a duration of fifteen minutes of cooking.

And the sixth can be potatoes with a duration of twenty-five minutes of cooking.

It is thus that the basket introduces a fifth position and whose programmed time of fifteen minutes is the shortest, will be evacuated first, then the sixth introduction at a time of twenty five minutes, will be evacuated second, etc.

Once the products have been cooked and evacuated, one can imagine that an identical apparatus, but equipped with a refrigeration system will take these products in their basket, and will introduce them into the environment of a refrigerated enclosure, equipped with a cooling fan and compressor, evaporators being placed so as not to disturb the carrier robot-arm. The time of the cooling system being programmed in a manner identical to the cooking, but with the duration of refrigeration appropriate to the product.

The products will thus have been cooked and cooled, then stored after evacuation, in the cooled chambers so as to be differentiated in cooling relationship. One can introduce in the apparatus all types of products to be cooked or cooled, particularly foods already treated in packages under vacuum, in steam cooking or submerged water, and this in cooking and cooling times which are adequate and necessary for each product.

Figure 1:
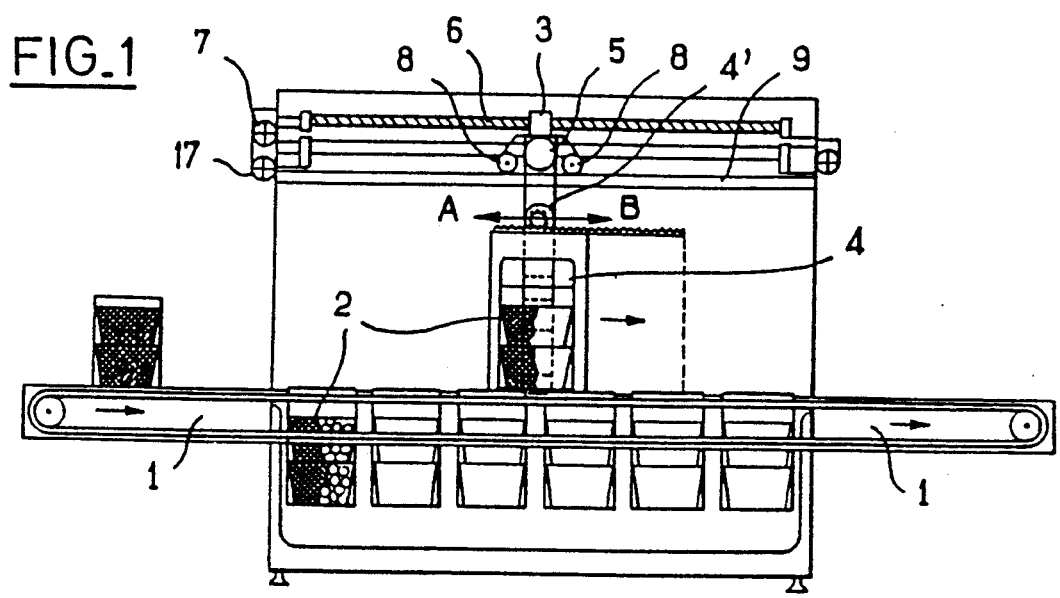
FIG. 1 illustrates in cross-section a front view of the apparatus according to the invention.

The apparatus shown in FIG. 1, comprises the apparatus with an evacuation and introduction conveyor 1, which brings the containers or baskets 2, perforated or not and provided with a handle in front of the gate 4 which slides, activated by motor 4' for the introduction of the baskets. This introduction occurs by means of a robot assembly 3, formed with a carrier gantry 5, which displaces from A to B and vice versa, by means of a threaded rod 6 activated by a motor 7, this gantry 5 is supported by rollers 8 which slide on rails 9, and which are positioned facing gate 4.

FIG. 1 illustrates likewise the baskets 2, placed side-by-side, in the cooking container 21, after their introduction.

Figure 2:
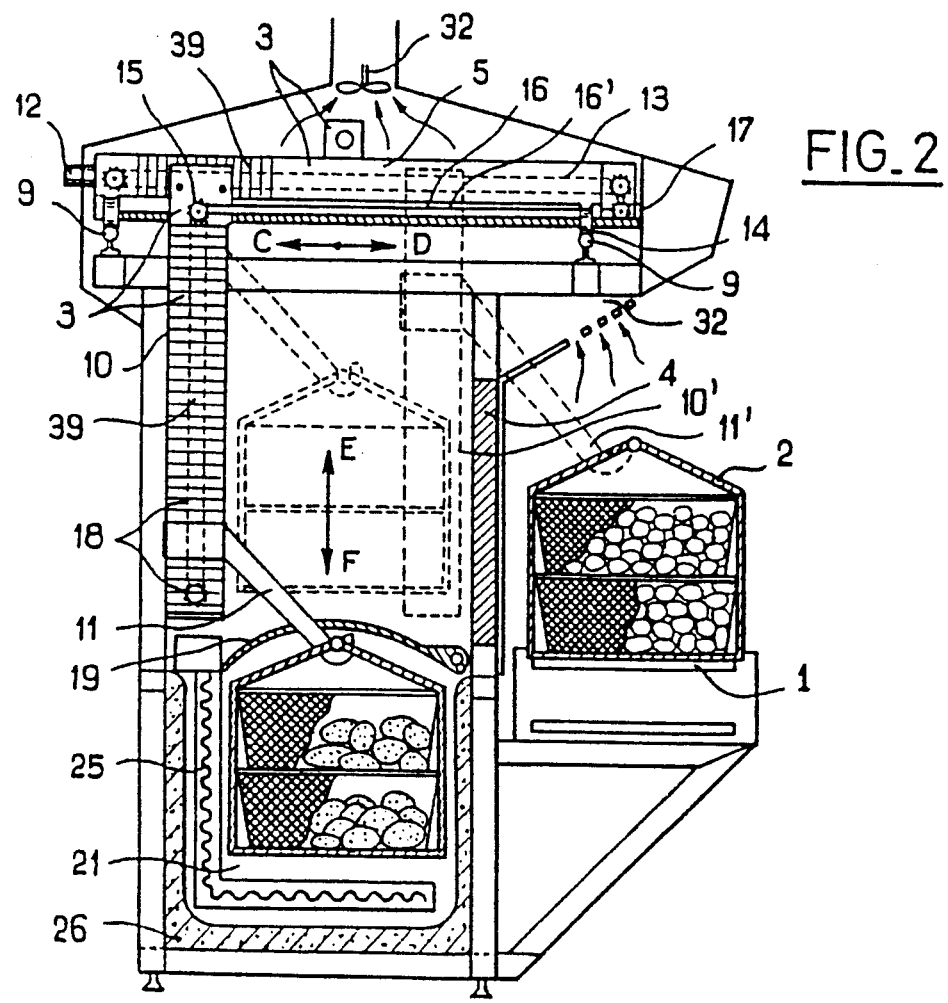
FIG. 2 illustrates in cross-section a side view of the apparatus and the operation of the robot assembly.

FIG. 2 illustrates the apparatus seen in cross-section, and shows the robot assembly 3 going to search the basket outside of the conveyor, to bring it into the container: once the gantry 5 is positioned in front of access gate 4, a carrier arm 10 of a hook 11 slides from C to D activated by a motor 12 by means of a chain 13 retransmitted by the channeled shaft 14. On the carrier arm 10, the hook 11 performs a raising and lowering from E to F by means of two channeled shafts 16 and 16' with a return angle 15 and are activated by a motor 17 retransmitting to a chain and pinion 18, thus causing to occur the raising and lowering of hook 11, such that the latter can seek the basket on the outside of gate 4.

The carrier arm 10' and the hook 11' are shown in dashed lines in front of the access gate 4.

Once the hook has siezed the handle of the basket, the carrier arm 10 slides again from D to C, reenters the basket, on the interior of the enclosure, then raises and lowers it, from hook 11 descends the basket in the cooking container 21 which closes cover 19.

When the individual cooking of each basket has ended, the robot assembly will perform the opposite movements, will come to seek the baskets depending upon the time which will have been programmed for each, and will deposit them on the conveyor which will evacuate them.

This robot assembly is protected by rubberbands 39 having expandible sides, allowing for a protection of the chains and of the channeled shafts, avoiding contaminations. These expandible sides being easily cleanable after each operation.

Figure 3:
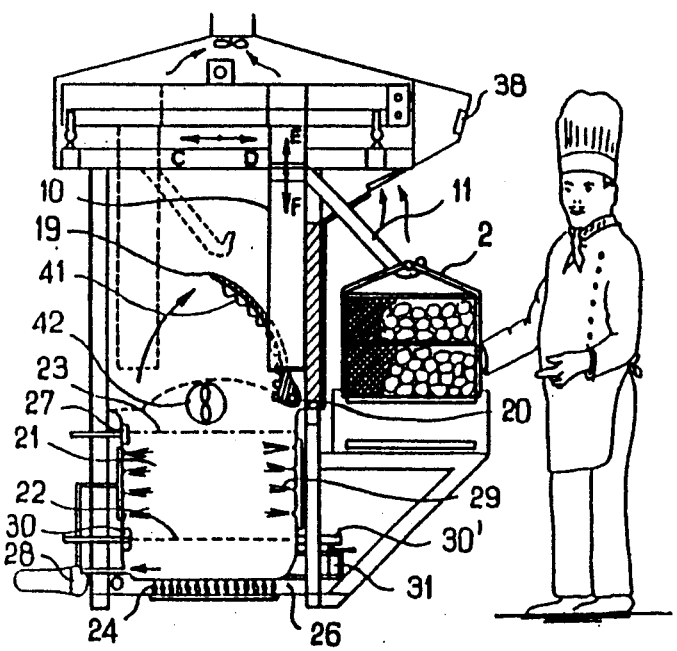
FIG. 3 illustrates in cross-section a side view of the apparatus in the course of loading with the cooking container.

A hood 32 makes it possible to evacuate the vapors, both on the interior of the enclosure as well as the exterior in front of the access gate 4, when the hot baskets will have been removed from the enclosure and deposited on the conveyor. FIG. 3 illustrates the apparatus in cross-section, with the carrier arm 10 and its hook 11 seeking the basket 2 on the exterior of the enclosure. Container 21 receiving the baskets can be filled to two different levels, a lower level 22 for the steam cooking, and an upper level 23 for the submerged water cooking, such as for pastas or others. But one can also replace the water by the oil for use as a fryer. An overflow (pipe) 27 avoids overflow. A recycle pump 28 with a filter makes it possible to eliminate starches, feculas and oils left by the foods, and by pressure the water is restored by jets 29 which make it possible to agitate the products to be cooked in submerged water such as the pastas so that they do not stick to one another.

In steam cooking an overflow (pipe) 30 with an oil recovery 30' maintains a constant level of water, and a drain 31 allows for the total evacuation of the container, particularly for the cleaning thereof.

After the gentle or flowing steam, one can also cook in dry vapor or superheated vapor by means of electrical resistance superheaters 41, which can be placed under cover 19, and ventilated by ventilators 42 placed on the lateral walls of the enclosure. The temperature of the dry vapor rises to 250° C., allows for the destruction of certain bacteria such as salmonnella.

The heating of the container can occur in various fashions: by a gas manifold 24 positioned under the container (FIG. 3) or by movable electrical quills 25 which can be removed at each cleaning (FIG. 2) or by a double envelope 26 containing thermal oil heated by electrical quills (FIG. 2), this double envelope surrounding the container.

The cover 19 shown in FIG. 3 is activated by a motor axis 20 which lifts the cover to allow for the introduction and evacuation of the basket. This motor axis being controlled and relayed simultaneously by the programmable timer directed on the console 38.

The closure and opening of each cover occurs once hook 11 has been raised on the carrier arm 10 from E to F.

Figure 4:
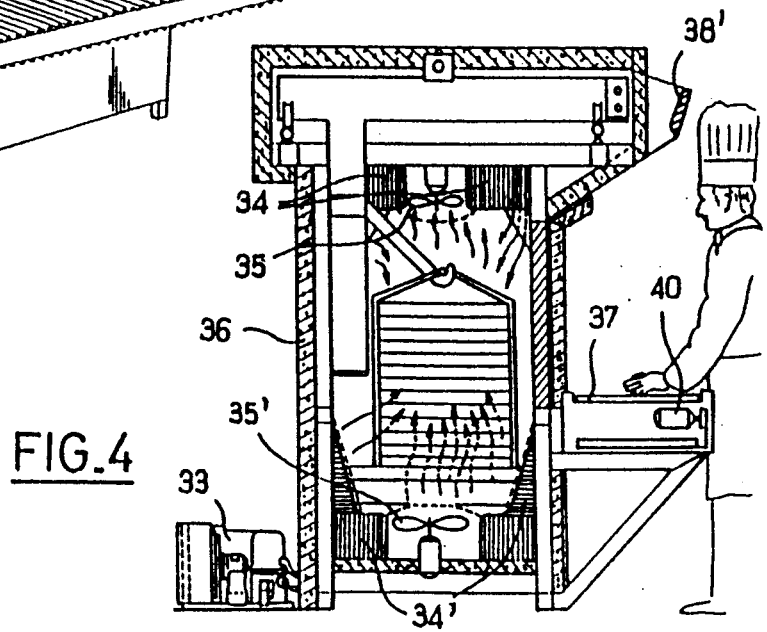
FIG. 4 illustrates in cross-section the refrigeration apparatus with the cold compressor.

FIG. 4 illustrates in cross-section the same apparatus, but in refrigeration, this one occuring by a cold compressor 33. The refrigerated enclosure being equipped with evaporators 34 and 34', with ventilators 35 and 35', and surrounded by a strong insulation 36.

The robot assembly system selecting the introduction and evacuation of the baskets is identical to the cooking apparatus described previously. The hood no longer being necessary for the refrigerating apparatus, this makes it possible to lodge there more easily the evaporators 34 and the ventilator 35. The baskets are brought and evacuated still by a conveyor 37 activated by a motor 40.

Everything being selected and controlled electronically on the console 38'.

Figure 5:
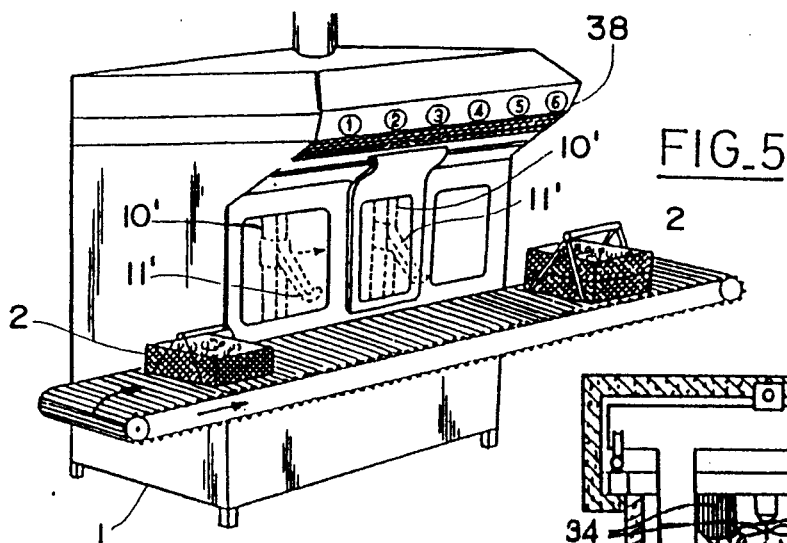
FIG. 5 illustrates the perspective view of the apparatus assembly.

FIG. 5 illustrates a perspective assembly of the apparatus, however, the shapes, arrangements as well as the handling means for the same result, can vary within the limit of equivalents, without this changing the spirit and design of the invention which has just been described.

What is claimed is:

1. An apparatus for cooking and refrigerating a product, said apparatus comprising:
   (a) a cooking unit for cooking a product for a first predeterminable period of time, said cooking unit comprising a first treatment container in which treatment comprising said cooking is conducted;
   (b) a refrigeration unit for refrigerating said product for a second predeterminable period of time, said refrigeration unit comprising a second treatment container in which treatment comprising said refrigeration is conducted; and
   (c) transportation means for
      (i) delivering said product toward said cooking unit;
      (ii) receiving said product from said cooking unit;
      (iii) delivering said product, received from said cooking unit, toward said refrigeration unit; and
      (iv) receiving said product from said refrigeration unit;
   each of said cooking unit and said refrigeration unit further comprising insertion and extraction means for
      removing said product from said transportation means;
      inserting said removed product into its corresponding treatment container for treatment;
      extracting said inserted product from its corresponding treatment container after treatment; and
      returning said extracted product to said transportation means;
   said insertion and extraction means being programmable to extract and return said product after treatment for a predeterminable amount of time.

2. The apparatus as defined by claim 1, wherein:
   (a) said apparatus is for cooking and refrigerating a plurality of products for predeterminable periods of time;
   (b) said product is a plurality of products; and
   (c) each of said insertion and extraction means is programmable to extract and return each of said plurality of products, after treatment for an amount of treatment time predeterminable for each of said plurality of products.

3. The apparatus as defined by claim 2, said cooking unit and said refrigeration unit each further comprising:
   (a) an enclosure wherein the treatment container of said unit resides, said enclosure defining an aperture;

(b) a closure means for opening and closing said aperture; and
(c) a first actuation means for actuating said closure means, said first actuation means opening said closing means:
  (1) to allow the insertion and extraction means of said unit to remove a product from said transportation means, and to introduce said removed product into said enclosure; and
  (2) to allow the insertion and extraction means of said unit to evacuate said product from said enclosure, and to return said product to said transportation means.

4. The apparatus as defined by claim 3, wherein:
(a) said transportation means is for carrying a plurality of baskets, each holding a product, past the aperture for each of said cooking unit and said refrigeration unit;
(b) the insertion and extraction means for each of said cooking unit and said refrigeration unit is for removing said plurality of baskets from said transportation means in order of their sequence of appearance before the aperture for each of said cooking unit and said refrigeration unit; and
(c) the treatment container for each of said cooking unit and said refrigeration unit is for receiving said plurality of baskets side by side, the number of baskets receivable by the treatment container for each of said cooking unit and said refrigeration unit depending upon the size of its corresponding unit.

5. The apparatus as defined by claim 4, said cooking unit and said refrigeration unit each comprising:
(a) a plurality of covers, each mounted in the enclosure of said unit for covering a basket situated in the treatment container of said unit; and
(b) a plurality of motor axes, each corresponding to a different one of said plurality of covers, each of said plurality of motor axes synchronized with the insertion and extraction means of said unit:
  (i) to lower its corresponding cover over a basket after insertion of said basket into the treatment container of said unit; and
  (ii) to raise its corresponding cover after completion of treatment to allow extraction of said basket from the treatment container of said unit.

6. The apparatus as defined by claim 4, wherein each insertion and extraction means is programmable to predetermine the period of treatment time for each product according to the position of its basket in the corresponding treatment container for each of said insertion and extraction means, the duration of said periods:
(a) potentially differing; and
(b) not depending upon the order in which said insertion and extraction means removes said plurality of products from said transportation means.

7. The apparatus as defined by claim 6, further comprising a programming means for programming each of said insertion and extraction means.

8. The apparatus as defined by claim 6, wherein each of said insertion and extraction means comprises:
(a) a carrier gantry laterally displaceable within the corresponding enclosure for said insertion and extraction means;
(b) a threaded first rod for laterally displacing said carrier gantry; and
(c) a second actuation means for actuating said threaded first rod to laterally displace said carrier gantry.

9. The apparatus as defined by claim 8, wherein each of said insertion and extraction means further comprises:
(a) a plurality of rollers supporting the carrier gantry of said insertion and extraction means; and
(b) a plurality of second rods on which said plurality of rollers slide during the lateral displacement of the carrier gantry of said insertion and extraction means.

10. The apparatus as defined by claim 9, wherein each of said insertion and extraction means further comprises:
(a) a carrier arm mounted on the carrier gantry of said insertion and extraction means, for advancing toward and withdrawing from the corresponding aperture for said insertion and extraction means;
(b) an endless belt for advancing and withdrawing said carrier arm;
(c) a third actuation means for actuating said endless belt; and
(d) a first channeled shaft for retransmitting said endless belt.

11. The apparatus as defined by claim 10, wherein each of said insertion and extraction means further comprises:
(a) a hook mounted on the carrier arm of said insertion and extraction means for vertical movement;
(b) a chain and pinion for raising and lowering said hood to engage baskets from said transportation means, to lower baskets into the corresponding treatment container for said insertion and extraction means, and to raise baskets out of the corresponding treatment container for said insertion and extraction means;
(c) two second channel shafts and a return angle for retransmitting to said chain and pinion; and
(d) a third actuating means for actuating said two channel shafts and return angle.

12. An apparatus for treatment of a plurality of products for predeterminable periods of time, said treatment being selected from the group consisting of cooking and refrigeration, said apparatus comprising:
(a) a treatment container in which said treatment is conducted;
(b) an enclosure wherein said treatment container resides, said enclosure defining an aperture;
(c) a closure means for opening and closing said aperture;
(d) transportation means for delivering said plurality of products toward and carrying said plurality of products away from said treatment container, said transportation means comprising a first endless belt for carrying a plurality of baskets, each holding a product, past said aperture;
(e) insertion and extraction means for:
  (i) removing said plurality of baskets from said first endless belt in order of their sequence of appearance before said aperture;
  (ii) inserting said removed plurality of baskets into said treatment container for treatment;
  (iii) extracting said inserted plurality of baskets from said treatment container after treatment; and
  (iv) returning said extracted plurality of baskets to said transportation means;
said insertion and extraction means being programmable to extract and return each of said plurality of baskets, after treatment for an amount of treatment time predeterminable for each of said plurality of products; and (f) a first actuation means for actuating said closure means, said first actuation means opening said closure means:

(1) to allow said insertion and extraction means to remove a basket from said first endless belt and to introduce said removed basket into said enclosure; and (2) to allow said insertion and extraction means to evacuate said basket from said enclosure, and to return said product to said first endless belt; wherein said treatment container is for receiving said plurality of baskets side by side, the number of baskets receivable by said treatment container depending upon the size of said apparatus.

13. The apparatus as defined by claim 12, wherein said apparatus is a refrigeration apparatus, said treatment is refrigeration, and said refrigeration apparatus comprises:

(a) a compressor;
(b) a plurality of evaporators; and
(c) a plurality of ventilators.

14. The apparatus as defined by claim 12, comprising:

(a) a plurality of covers, each mounted in said enclosure for covering a basket situated in said treatment container; and (b) a plurality of motor axes, each corresponding to a different one of said plurality of covers, each of said plurality of motor axes synchronized with said insertion and extraction means:

(i) to lower its corresponding cover over a basket after insertion of said basket into said treatment container; and (ii) to raise its corresponding cover after completion of treatment to allow extraction of said basket from said treatment container.

15. The apparatus as defined by claim 12, wherein said insertion and extraction means is programmable to predetermine the period of treatment time for each product according to the position of its basket in the treatment container, the duration of said periods:

(a) potentially differing; and (b) not depending upon the order in which said insertion and extraction means removes said plurality of products from said first endless belt.

16. The apparatus as defined by claim 15, further comprising a programming means for programming said insertion and extraction means.

17. The apparatus as defined by claim 15, wherein said insertion and extraction means comprises:

(a) a carrier gantry laterally displaceable within said enclosure;

(b) a threaded first rod for laterally displacing said carrier gantry; and (c) a second actuation means for actuating said threaded first rod to laterally displace said carrier gantry.

18. The apparatus as defined by claim 17, wherein said insertion and extraction means further comprises:

(a) a plurality of rollers supporting said carrier gantry; and (b) a plurality of second rods on which said plurality of rollers slide during the lateral displacement of said carrier gantry.

19. The apparatus as defined by claim 18, wherein said insertion and extraction means further comprises:

(a) a carrier arm mounted on said carrier gantry for advancing toward and withdrawing from said aperture;

(b) a second endless belt for advancing and withdrawing said carrier arm;

(c) a third actuation means for actuating said second endless belt; and (d) a first channeled shaft for retransmitting said second endless belt.

20. The apparatus as defined by claim 19, wherein said insertion and extraction means further comprises:

(a) a hook mounted on said carrier arm for vertical movement;

(b) a chain and pinion for raising and lowering said hook to engage baskets from said first endless belt, to lower baskets into said treatment container, and to raise baskets out of said treatment container;

(c) two second channeled shafts and a return angle for retransmitting to said chain and pinion; and (d) a third actuating means for actuating said two channel shafts and return angle.

21. The apparatus as defined by claim 20 wherein said apparatus is a refrigeration apparatus, said treatment is refrigeration, and said refrigeration apparatus comprises:

(a) a compressor;
(b) a plurality of evaporators; and
(c) a plurality of ventilators.

22. The apparatus as defined by claim 20, comprising a plurality of motor axes, each corresponding to a different one of said plurality of covers, and each of said plurality of motor axes synchronized with said insertion and extraction means;

(a) to lower its corresponding covers over a basket after insertion of said basket into said treatment container; and (b) to raise its corresponding cover after completion of treatment prior to extraction of said basket from said treatment container.

23. The apparatus as defined by claim 22 wherein each of said plurality of motor axes is programmable:

(a) to lower its corresponding cover over a basket after insert of said basket into said treatment container; and (b) to raise its corresponding cover after completion of treatment prior to extraction of said basket from said treatment container.

24. The apparatus as defined by claim 23, further comprising a programming means for programming:

(a) said insertion and extraction means; and
(b) said plurality of motor axes.

25. The apparatus as defined by claim 20 wherein said apparatus is a cooking apparatus for conducting different cooking processes, said treatment is cooking, and said cooking apparatus comprises a plurality of covers, each mounted in said enclosure for covering a basket situated in said cooking container, said cooking container comprising:

(a) for facilitating a liquid immersion cooking process selected from the group consisting of water boiling and oil frying:

(i) an upper overflow pipe to prevent liquid from spilling over said treatment container during said liquid immersion cooking process; and (ii) recovering plurality of jets to deliver water into said treatment container for agitating said plurality of products during said water boiling process;

(b) for facilitating a steam cooking process:

(i) a lower overflow pipe to prevent water from rising in said treatment container above the level appropriate for said steam cooking process; and (ii) recovery means for recovering oil.

26. The cooking apparatus as defined by claim 25 wherein, for facilitating a superheated vapor cooking process subsequent to said steam cooking process, said cooking apparatus comprises:

(a) a plurality of electric resistance superheaters to provide superheated vapor; and (b) a fan mounted in said enclosure to provide lateral ventilation.

27. The cooking apparatus as defined by claim 26 comprising heating means for heating said cooking container, said heating means being selected from the group consisting of:

(a) a gas manifold situated beneath said cooking container;

(b) movable elective quills; and (c) a double envelop for containing thermal oil, and electric quills for heating said thermal oil.

* * * * *